Patented Nov. 28, 1922.

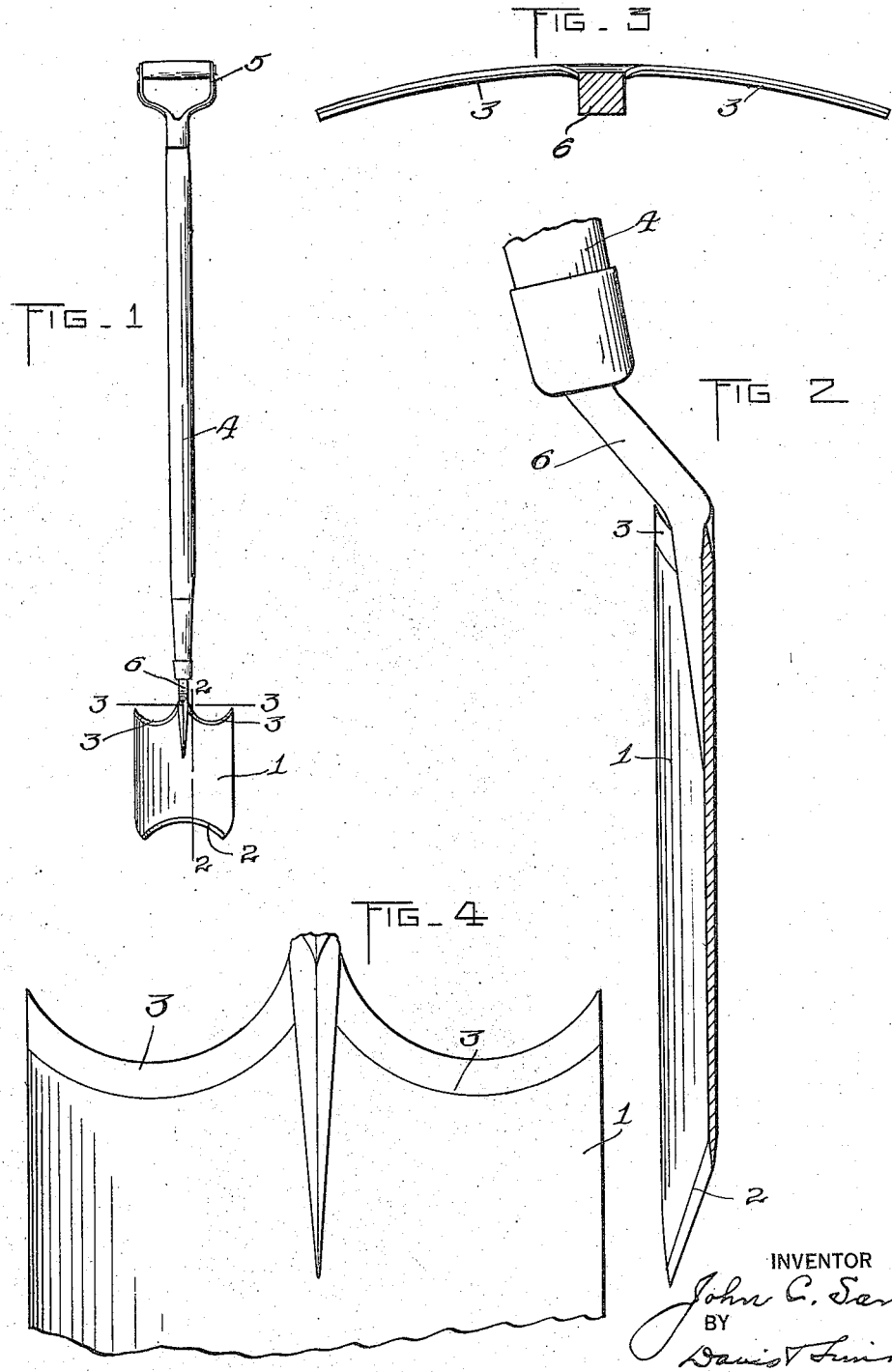

1,437,199

UNITED STATES PATENT OFFICE.

JOHN C. SAME, OF ROCHESTER, NEW YORK, ASSIGNOR OF ONE-HALF TO EDWARD J. FITZ GERALD, OF ROCHESTER, NEW YORK.

PLANT CUTTER OR HARVESTER.

Application filed January 21, 1921. Serial No. 438,895.

*To all whom it may concern:*

Be it known that I, JOHN C. SAME, a citizen of the United States, and resident of Rochester, in the county of Monroe and State of New York, have invented certain new and useful Improvements in Plant Cutters or Harvesters, of which the following is a specification.

The present invention relates to plant cutters or harvesters, and an object of the same is to provide a cutter which may be used effectively for harvesting or cutting cabbage and similar plants.

To this and other ends, the invention consists of certain parts and combinations of parts all of which will be hereinafter described, the novel features being pointed out in the appended claim.

In the drawings:—

Fig. 1 is a plan view of a cutter constructed in accordance with this invention;

Fig. 2 is an enlarged longitudinal section through the cutter on the line 2—2, Fig. 1;

Fig. 3 is a transverse section on the line 3—3, Fig. 1; and

Fig. 4 is an enlarged fragmentary view of the rear edge of the cutter.

Referring more particularly to the drawings, 1 indicates the blade which in this instance is in the form of a sheet metal plate curved transversely. The forward edge of this plate is provided with a notch 2 of curved or substantially U-shaped form extending substantially the width of the blade and having the wall formed by a knife edge. The rear edge of the blade is formed with two notches 3, the wall of each of which is in this instance of curved or substantially U-shaped form with a knife edge and extends from one side edge of the blade to a point adjacent the center of such blade.

The blade is provided with a handle 4 which may have a hand piece 5 at one end and, through a shank or stem 6, connects with the blade. This connection is such that the blade lies in a plane at a slight angle to the longitudinal axis of the handle.

With a construction such as herein set forth it is possible to cut a plant either by a forward movement of the blade, when the forward cutting edge will be effective, or by a rearward movement of the blade, when either one of the rear cutting edges may be employed. The arrangement of the blade at a slight angle to the longitudinal axis of the handle throws the rear cutting edges to positions where they will be more readily effective than if the plane of the blade were in the plane of the longitudinal axis of the handle.

What I claim as my invention and desire to secure by Letters Patent is:

A plant cutter comprising a handle, a blade, and a stem connecting the handle with the edge of the blade at a point midway between the sides of the blade and arranged to support the blade at an angle to the length of the handle, the blade being straight in the direction of its length, curved transversely throughout its length and having a single substantially U shaped notch in its front edge, the wall of said notch having a knife edge, said blade having also two substantially U shaped notches in its rear edge, the walls of each notch also being formed with a knife edge, the deepest portions of both of said notches being situated substantially midway between the stem and the adjacent side edge of the blade.

JOHN C. SAME.